(12) United States Patent
Richardson

(10) Patent No.: US 12,007,050 B2
(45) Date of Patent: Jun. 11, 2024

(54) HYGIENIC COUPLING

(71) Applicant: Alpha Process Controls International Limited, Peterlee (GB)

(72) Inventor: Ben Richardson, Peterlee (GB)

(73) Assignee: Alpha Process Controls International Limited, Peterlee (GB)

( * ) Notice: Subject to any disclaimer, the term of this patent is extended or adjusted under 35 U.S.C. 154(b) by 0 days.

(21) Appl. No.: 17/738,716

(22) Filed: May 6, 2022

(65) Prior Publication Data

US 2022/0356972 A1  Nov. 10, 2022

(30) Foreign Application Priority Data

May 6, 2021 (GB) ..................... 2106488

(51) Int. Cl.
*F16L 29/04* (2006.01)
*F16L 29/02* (2006.01)

(52) U.S. Cl.
CPC ............. F16L 29/04 (2013.01); F16L 29/02 (2013.01); *F16L 2201/30* (2013.01)

(58) Field of Classification Search
CPC ....... F16L 29/04; F16L 29/02; F16L 55/1007; F16L 55/1015; F16L 23/036; F16L 2201/30
See application file for complete search history.

(56) References Cited

U.S. PATENT DOCUMENTS 2,304,390 A * 12/1942 Wolfram .................. F16L 29/04
137/614.03
2,319,015 A * 5/1943 Speth ....................... F16L 29/04
137/614.03

(Continued)

FOREIGN PATENT DOCUMENTS

DE 4202491 C1 * 5/1993 .......... F16L 55/1007
DE 4202491 C1 5/1993

(Continued)

OTHER PUBLICATIONS

Combined Search and Examination Report under Sections 17 and 18(3) dated Feb. 9, 2022, issued in United Kingdom Patent Application No. GB2106488.6, 11 pages.
Extended European Search Report dated Sep. 21, 2022, issued in European Application No. EP 22172041, 9 pages.
European Examination Report received in connection with European Application No. 22172041.0, dated Dec. 15, 2023, 7 pages.

(Continued)

*Primary Examiner* — David Colon-Morales
(74) *Attorney, Agent, or Firm* — Meunier Carlin & Curfman LLC

(57) ABSTRACT

A coupling for use with comestible products having a first body with a first flow path extending therethrough and a second body with a second flow path extending therethrough. The first and second bodies are configured for coupling together such that the first and second flow paths form a continuous flow path through the coupling. The coupling further comprises a first valve member actuable between an open position, wherein product can pass through the first flow path, and a closed position, wherein the passage of product through the first flow path is prevented, and a first biasing member for biasing the first valve member into the closed position. The coupling is configured such that, if the first and second bodies become decoupled from one another, the first valve member is moved into the closed position. The first biasing member is isolated from the flow path passing through the coupling.

15 Claims, 4 Drawing Sheets

(56) References Cited

U.S. PATENT DOCUMENTS

| | | | | |
|---|---|---|---|---|
| 2,451,218 A * | 10/1948 | Hengst | ............... | F16L 29/04 |
| | | | | 137/614.04 |
| 2,931,668 A * | 4/1960 | Baley | ............... | F16L 29/04 |
| | | | | 137/614.04 |
| 3,213,884 A * | 10/1965 | Moyer | ............... | F16L 37/23 |
| | | | | 137/625.48 |
| 3,446,245 A * | 5/1969 | Snyder, Jr. | ............... | F16L 15/008 |
| | | | | 285/276 |
| 3,478,762 A * | 11/1969 | McCullough | ......... | F16L 23/036 |
| | | | | 137/71 |
| 3,659,877 A * | 5/1972 | Kubasta | ............... | F16B 31/021 |
| | | | | 285/368 |
| 3,706,318 A * | 12/1972 | Baniadam | ............... | F16L 29/04 |
| | | | | 251/149.4 |
| 4,287,914 A * | 9/1981 | Buseth | ............... | F16L 29/04 |
| | | | | 137/508 |
| 4,625,761 A * | 12/1986 | Uchida | ............... | F16L 29/04 |
| | | | | 251/149.8 |
| 4,921,000 A * | 5/1990 | King | ............... | B63B 27/24 |
| | | | | 137/68.14 |
| 5,407,175 A * | 4/1995 | Roberts | ............... | F16L 29/04 |
| | | | | 285/414 |
| 6,082,401 A * | 7/2000 | Braun | ............... | F16L 37/0841 |
| | | | | 137/614.04 |
| 6,170,522 B1 * | 1/2001 | Tanida | ............... | F16L 29/04 |
| | | | | 137/614.04 |
| 6,176,263 B1 * | 1/2001 | Lacroix | ............... | F16L 29/04 |
| | | | | 251/149.6 |
| 11,168,824 B2 * | 11/2021 | Tandberg | ............... | F16L 37/32 |
| 2007/0102923 A1 * | 5/2007 | Niemela | ............... | A61M 16/183 |
| | | | | 285/95 |
| 2020/0182389 A1 * | 6/2020 | Frère | ............... | F16K 15/063 |

FOREIGN PATENT DOCUMENTS

| | | | | |
|---|---|---|---|---|
| DE | 4430132 | C1 * | 9/1995 | ............... F16L 29/04 |
| EP | 0159984 | A1 | 11/1985 | |
| EP | 2565508 | A1 * | 3/2013 | ............... F16L 29/04 |
| GB | 2269872 | A * | 2/1994 | ............... F16L 29/04 |
| GB | 2575539 | A | 1/2020 | |
| KR | 20180109161 | A * | 10/2018 | |
| KR | 20200028683 | A * | 3/2020 | |
| KR | 20200028683 | A | 3/2020 | |

OTHER PUBLICATIONS

GB Examination Report received in connection with GB Application No. GB2106488.6, dated Jul. 27, 2023, 5 pages.

* cited by examiner

HYGIENIC COUPLING

CROSS-REFERENCE TO RELATED APPLICATIONS

This application claims priority to United Kingdom Patent Application Number 2106488.6, filed on May 6, 2021, the contents of which is incorporated herein by reference in its entirety.

FIELD

The present disclosure relates to a coupling for use with comestible products.

BACKGROUND

Couplings for fluid flow lines which incorporate a self-closing mechanism are well known in the art, particularly in applications which involve potentially hazardous fluids where spillages must be avoided.

An example of such a coupling is described in UK Patent GB 2575539 A, which discloses a two-part coupling for use with cryogenic fluids such as liquefied natural gas.

The coupling has first and second bodies which provide a flow path through the coupling. When the first and second bodies of the coupling are coupled together, the first and second valve heads can each be actuated into an open position, e.g. via a handle, to allow fluid to flow through the coupling. However, should the first and second bodies become detached during use, the coupling is configured such that the valve heads on the respective bodies are immediately actuated into the closed position to help minimise spillage.

However, the coupling described above is not suitable for a number of industries, particularly those which handle comestible products. It is therefore an aim of the present disclosure to provide a coupling which addresses at least one of the aforementioned problems.

SUMMARY

A first aspect of the disclosure provides a coupling comprising:
- a first body having a first flow path extending therethrough;
- a second body having a second flow path extending therethrough;
- wherein the first and second bodies are configured for coupling together such that the first and second flow paths form a continuous flow path extending through the coupling;
- the coupling further comprising a valve member actuable between an open position, wherein product is able to pass through the continuous flow path, and a closed position, wherein the passage of product through the continuous flow path is prevented;
- wherein the coupling comprises a closure mechanism configured for actuating the valve member between the open and closed positions.

In exemplary embodiments, the coupling is for use with comestible products, which may be provided in particulate form, fluid form (liquid or gas), or as particles suspended or entrained in a fluid (liquid or gas).

In exemplary embodiments, the coupling is configured for switching the valve member from the open position to the closed position if the first and second bodies are decoupled from one another. Advantageously, the coupling of such exemplary embodiments is configured as a self-closing coupling, so that flow of product can be prevented in the event of undesired decoupling of the first and second bodies, for example.

In exemplary embodiments, the coupling is configured so that at least part of closure mechanism is isolated from the flow path extending through the coupling. Advantageously, isolating at least part of the closure mechanism from the flow path reduces the exposure of components of the coupling to product passing through the coupling, and reduces the opportunities for product build-up within the coupling.

In exemplary embodiments, the closure mechanism includes a biasing member for biasing the valve member into the closed position.

In exemplary embodiments, the biasing member is isolated from the flow path extending through the coupling.

Advantageously, by isolating the biasing member from the flow path, the opportunities for build-up of product within the closure mechanism is reduced, which results in a more hygienic coupling. This is particularly, but not exclusively, the case in exemplary embodiments in which the biasing member is a coil spring, where product particles might otherwise become trapped in or around the coil configuration, and which might be difficult to flush out under conventional cleaning techniques.

In exemplary embodiments, the coupling is configured such that, if the first and second bodies become decoupled from one another, the biasing member drives the valve member to the closed position.

In exemplary embodiments, the biasing member is operable in a first chamber which is isolated from the continuous flow path.

Advantageously, having the biasing member in a chamber isolated from the continuous flow path promotes a hygienic, more easily cleanable coupling.

In exemplary embodiments, the biasing member is in operable communication with the valve member.

In exemplary embodiments, the first chamber is at least partially defined within a cylinder provided within the first body.

In exemplary embodiments, the interior of the cylinder is isolated from a flow of product from the continuous flow path.

Advantageously, isolating the cylinder from the continuous flow path promotes a hygienic, more easily cleanable flow path.

In exemplary embodiments, the valve member comprises a piston-like body, a portion of which extends within the cylinder and is arranged for reciprocation within the cylinder, for moving the valve member between the open and closed positions.

Such a piston/cylinder arrangement promotes simple and controlled movement of the valve member, and allows for a hygienic, more easily cleanable flow path.

In exemplary embodiments, the coupling further comprises a cylinder seal located between the cylinder and piston-like body for sealing the cylinder against product ingress.

Advantageously, the cylinder seal provides an effective means for isolating the first biasing member/closure mechanism.

In exemplary embodiments, the coupling further comprises a test port having a first end in fluid communication with the cylinder and a second end in fluid communication with external atmosphere.

Advantageously, the provision of a test port enables an operator to more easily monitor the integrity of the cylinder seal between the cylinder and the valve body.

In exemplary embodiments, the cylinder and test port together define a first leakage flow path between the cylinder seal and the test port for monitoring the integrity of the sealing effect between the cylinder and the piston-like body.

Advantageously, the provision of the first leakage flow path means that, should the integrity of the cylinder seal fail, any product or fluid will be communicated to the cylinder of the coupling where it can be quickly detected via the test port. As such, this provision helps the operator to more easily monitor the integrity of the cylinder seal.

Advantageously, the provision of a test port enables an operator to more easily monitor the integrity of the annular seal between the valve head and the valve body.

In exemplary embodiments, the cylinder is arranged within the first flow path, such that product is able to flow around a circumference of the cylinder as it passes along the first flow path.

Advantageously, extending the first flow path around the circumference of the first chamber helps to improve the flow capacity of the coupling.

In exemplary embodiments, the coupling further comprises a plurality of arms extending inwardly from the first body, and which support the cylinder within the first flow path.

The use of a plurality of arms, such as between two and four arms, typically arranged in a uniform radial array, with the cylinder as a hub, can provide for stability of the cylinder without undue impact on the flow capacity of the first flow path.

In exemplary embodiments, the plurality of supporting arms are integrally formed as part of the first body and/or the cylinder.

Advantageously, forming the first chamber integrally with the first body helps to reduce the number of parts required for the coupling, thereby making the coupling simpler to manufacture.

In exemplary embodiments, the piston-like body comprises an internal bore, and wherein the biasing member extends at least partially within said internal bore. It will be understood, therefore, that the first chamber comprises said internal bore in exemplary embodiments.

In exemplary embodiments, the piston-like body extends from an open end of the cylinder.

In exemplary embodiments, the internal bore extends within the piston-like body beyond an open end of the cylinder.

In exemplary embodiments, the biasing member extends within the internal bore beyond the open end of the cylinder.

In exemplary embodiments, the biasing member is a spring (e.g. a coil spring), which is arranged to be under compressive load when the valve member is in both the open and closed positions.

Advantageously, the provision of a coil spring provides an effective means for biasing the valve member into the closed position.

Furthermore, since the spring is arranged to be under compressive load when the valve member is in the closed position which urges the valve member into the closed position, the coupling is able to further minimise the likelihood product egress when the valve is in the closed position.

In exemplary embodiments, the valve member has a valve head located external to the cylinder, wherein the valve head is configured to cooperate with an annular seal surface within the coupling, for preventing product flow through the first body when the valve member is in the closed position.

In exemplary embodiments, the annular seal surface is provided on the first body; optionally, wherein the annular seal surface is part of a wall of the first flow path.

In exemplary embodiments, the valve head includes an annular seal element arranged for cooperation with said annular seal surface.

Advantageously, the provision of an annular seal element helps to prevent direct contact between the respective valve members thereby helping to reduce the likelihood product egress when the valve is in the closed position.

In exemplary embodiments, the annular seal element is of deformable nature. Using a deformable seal allows for the seal element to be compressed into sealing abutment with the seal surface.

In exemplary embodiments, the coupling is configured such that the biasing member applies a load to urge the annular seal against the seal surface of the first body when the valve member is in the closed position, e.g. to compress the seal element into sealing abutment with the seal surface.

In exemplary embodiments, the valve member comprises a valve head and a valve body which are formed as separate, releasably connectable components, wherein the annular seal is housed between the valve head and the valve body, and provides a seal between the valve head and the valve body.

In exemplary embodiments, the valve body comprises the piston-like body.

In exemplary embodiments, the valve member defines an internal channel extending from the annular seal to the cylinder.

In exemplary embodiments, the coupling further comprises a test port having a first end in fluid communication with the cylinder and a second end in fluid communication with external atmosphere.

Advantageously, the provision of a test port enables an operator to more easily monitor the integrity of the annular seal between the valve head and the valve body.

In exemplary embodiments, the internal channel, cylinder and test port together define a second leakage flow path extending from the annular seal to the external atmosphere for monitoring the integrity of the sealing effect between the valve head and valve body.

Advantageously, the provision of the second leakage flow path means that, should the integrity of the annular seal fail, any product or fluid will be communicated to the cylinder of the coupling where it can be quickly detected via the test port. As such, this provision helps the operator to more easily monitor the integrity of the annular seal.

In exemplary embodiments, a first portion of the internal channel is defined by a passageway provided in the valve head and wherein a second portion of the internal channel is defined by an internal bore of the piston-like body.

In exemplary embodiments the coupling further comprises at least one sensor for monitoring the integrity of the one or more seals provided within the coupling.

Advantageously, the provision of a sensor helps the system to monitor the integrity of the seals more quickly and efficiently.

In exemplary embodiments, at least sensor is at least one pressure sensor.

In exemplary embodiments, wherein the at least one sensor is located in the test port.

In exemplary embodiments, the first chamber comprises a leakage groove or channel for conveying product or fluid within the first chamber to the first end of the first test port.

Advantageously, the provision of such a leakage groove helps to further improve the ease by which an operator can monitor the integrity of the cylinder seal since any product or fluid within the sealed chamber will be conveyed to the test port via the leakage groove.

In exemplary embodiments, the valve member comprises a valve body and a valve head.

In exemplary embodiments, the biasing member is provided in operable communication with the valve head.

In exemplary embodiments, the valve head is configured to cooperate with an annular seal surface within the coupling, for preventing product flow through the first body when the valve member is in the closed position.

In exemplary embodiments, the annular seal surface is provided on the first body.

In exemplary embodiments, wherein the annular seal surface is part of a wall of the first flow path.

In exemplary embodiments, the valve head includes an annular seal element arranged for cooperation with said annular seal surface.

In exemplary embodiments, the annular seal element is of deformable nature. Using a deformable seal allows for the seal element to be compressed into sealing abutment with the seal surface.

In exemplary embodiments, the coupling is configured such that the biasing member applies a load to urge the annular seal against the seal surface of the first body when the valve member is in the closed position, e.g. to compress the seal element into sealing abutment with the seal surface.

In exemplary embodiments, the coupling is configured so that the annular seal element is the only point of contact between the valve head and the annular seal surface.

Advantageously, this provision helps to prevent metal-to-metal contact between the valve head and the annular seal surface which helps to prevent wear between the valve head and annular seal surface and which also helps to better prevent egress of product between the valve head and the annular seal surface when the valve member is in the closed position.

In exemplary embodiments, the first body comprises a plurality of releasably connectable sections including a front portion for cooperation with the second body when the first and second bodies are coupled together, and a rear portion in which the biasing member is mounted.

Advantageously, the provision of releasable connectable front and rear portions helps to improve the ease by which internal components can be inserted into the coupling during assembly.

In exemplary embodiments, the valve member is carried on the rear portion.

In exemplary embodiments, the coupling further comprises an annular seal located outboard of the first flow path for creating a seal between the front and rear portions of the first body.

In exemplary embodiments, the coupling is configured such that metal-to-metal contact between the front and rear portions inboard of the annular seal is prevented.

Advantageously, by preventing metal-to-metal contact between the front and rear portions of the first body inboard of the annular seal, the coupling is able to better prevent product becoming trapped in difficult to clean spaces between the front and rear portions which would be detrimental to hygiene. As such, by preventing metal-to-metal contact between the front and rear portions inboard of the annular seal, a more hygienic coupling can be provided.

It shall be appreciated however that in some embodiments, there may be metal-to-metal contact between the front and rear portions outboard of the annular seal away from the flow path. Since such contact takes place away from the flow path, metal-to-metal contact between the front and rear portions outboard of the annular seal is not detrimental to hygiene.

In exemplary embodiments, the front portion of the first body defines an annular seal surface for cooperation with the valve member to prevent flow of product through the first flow path In exemplary embodiments, the annular seal surface is an angled seal surface.

In exemplary embodiments, the valve member includes an annular seal element for cooperation with said annular seal surface.

In exemplary embodiments, the coupling is configured such that the first biasing member applies a load to the valve member so as to urge the annular seal against the annular seal surface when the valve member is in the closed position.

In exemplary embodiments, the annular seal element is of deformable nature.

In exemplary embodiments, the coupling is configured so that the annular seal element is the only point of contact between the valve head and the annular seal surface.

Advantageously, this provision helps to prevent metal-to-metal contact between the valve head and the annular seal surface which helps to prevent wear between the valve head and annular seal surface and which also helps to better prevent egress of product between the valve head and the annular seal surface when the valve member is in the closed position.

In exemplary embodiments, the valve member extends out of the first body when the valve member is in the closed position, and wherein the coupling is configured such that, when the first and second bodies are brought together, a load is applied to the first valve member to cause the first valve member to move from the closed position to the open position.

Advantageously, this provision enables the valve member to be actuated without the need for any additional mechanisms (such as a handle or lever).

In exemplary embodiments, the first and second bodies each comprise:
 a valve member actuable between an open position, wherein product is able to pass through the continuous flow path, and a closed position, wherein the passage of product through the continuous path is prevented; and
 a closure mechanism configured for actuating the valve member between the open and closed positions;
 wherein each closure mechanism includes a biasing member for biasing the respective valve member into the closed position; and
 wherein each biasing member is isolated from the flow of product passing through the continuous flow path.

Advantageously, the provision of a corresponding valve members helps to further reduce the likelihood of spillage in the event of the first and second bodies becoming detached.

In exemplary embodiments, the coupling further comprises an annular seal located outboard of the flow path for creating a seal between the first and second bodies.

In exemplary embodiments, the coupling is configured such that metal-to-metal contact between the first and second bodies inboard of the annular seal is prevented.

Advantageously, by preventing metal-to-metal contact between the first and second bodies inboard of the annular seal, the coupling is able to better prevent product becoming trapped in difficult to clean spaces between the respective bodies which would be detrimental to hygiene. As such, by preventing metal-to-metal contact between the first and second bodies inboard of the annular seal, a more hygienic coupling can be provided.

It shall be appreciated however that in some embodiments, there may be metal-to-metal contact between the first and second bodies outboard of the annular seal away from the flow path. Since such contact takes place away from the flow path, metal-to-metal contact between the first and second bodies outboard of the annular seal is not detrimental to hygiene.

In exemplary embodiments, the annular seal is located within a groove formed by the respective interfaces of the first and second bodies.

In exemplary embodiments, the coupling is configured for each valve member to switch from the open to closed position if the first and second bodies are decoupled from one another.

In exemplary embodiments, the coupling is arranged such that the valve member of the first body cooperates with the valve member of the second body when the first and second bodies are brought together, and wherein the coupling further comprises a valve sealing element to provide a seal between the cooperating valve members.

In exemplary embodiments, the coupling is configured such that metal-to-metal contact between the cooperating valve members outboard of the valve sealing element is prevented.

Advantageously, by preventing metal-to-metal contact between the cooperating valve members outboard of the valve sealing element, the coupling is able to better prevent wear and also prevent product becoming trapped in difficult to clean spaces between the valve members which would be detrimental to hygiene. As such, by preventing metal-to-metal contact between cooperating valve members outboard of the valve sealing element, a more hygienic coupling can be provided.

It shall be appreciated however that in some embodiments, there may be metal-to-metal contact between the cooperating valve members inboard of the annular seal away from the flow path. Since such contact takes place away from the flow path, metal-to-metal contact between the valve members inboard of the valve sealing element is not detrimental to hygiene.

In exemplary embodiments, the coupling further comprises an interior fastener configured to compress the valve sealing element when valve members are in cooperation with one another.

Advantageously, the provision of an interior fastener helps to ensure compression of the seal between the first and second valve members.

In exemplary embodiments, the interior fastener is a frangible bolt configured to break upon application of a pre-determined amount of force.

Advantageously, the provision of a frangible bolt helps to limit the amount of force that can be applied to components of the flow line via the coupling, thereby helping to prevent damage to the flow line during installation and use.

In exemplary embodiments, the frangible bolt is configured to break when exposed to forces in the range of 5,000 N to 30,000 N.

In exemplary embodiments, the at least one of the valve members comprises a threaded bore for receiving an interior fastener of the coupling.

In exemplary embodiments, the valve member defines an internal channel extending from the threaded bore to the cylinder.

In exemplary embodiments, the coupling further comprises a test port having a first end in fluid communication with the cylinder and a second end in fluid communication with external atmosphere.

Advantageously, the provision of a test port enables an operator to more easily monitor the integrity of the valve sealing element between the cooperating valve heads.

In exemplary embodiments, the internal channel, cylinder and test port together define a third leakage flow path extending from the threaded bore to the external atmosphere for monitoring the integrity of the sealing effect between the cooperating valve members.

Advantageously, the provision of the third leakage flow path means that, should the integrity of the valve sealing element fail, any product or fluid will be communicated to the cylinder of the coupling where it can be quickly detected via the test port. As such, this provision helps the operator to more easily monitor the integrity of the valve sealing element.

In exemplary embodiments, the coupling is configured to switch from the closed position to the open position when the first and second bodies are brought together.

Advantageously, this provision enables the first valve member to be actuated without the need for any additional mechanisms (such as a handle or lever).

In exemplary embodiments, the first body comprises an interface for coupling with a corresponding interface of the second body.

In exemplary embodiments, the interface of the first body defines a plane, and at least a portion of the first valve member extends beyond said plane when the first valve member is in the closed position.

In exemplary embodiments, the second body is substantially identical to the first body, insofar as: at least part of closure mechanism of the second body is isolated from the flow path extending through the coupling, wherein the closure mechanism may include a biasing member for biasing the valve member of the second body into the closed position, wherein the biasing member may be isolated from the flow path extending through the coupling; and/or the coupling is configured such that, if the first and second bodies become decoupled from one another, the biasing member of the second body drives the valve member of the second body to the closed position; and/or the biasing member is operable in a second chamber which is isolated from the continuous flow path, and wherein the second chamber may be at least partially defined within a cylinder provided within the second body, and wherein the interior of the cylinder may be isolated from a flow of product from the continuous flow path; and/or wherein valve member comprises a piston-like body, a portion of which extends within the cylinder and is arranged for reciprocation within the cylinder, for moving the valve member between the open and closed positions; and/or wherein the cylinder is arranged within the second flow path, such that product is able to flow around a circumference of the cylinder as it passes along the second flow path; and/or wherein the piston-like body comprises an internal bore, and wherein the biasing member extends at least partially within said internal bore. Other similarities for additional or alternative exemplary embodiments will be apparent from the description and accompanying drawings.

BRIEF DESCRIPTION OF THE DRAWINGS

Embodiments of the disclosure will now be described with reference to the accompanying drawings, in which.

DETAILED DESCRIPTION

Figure 1:
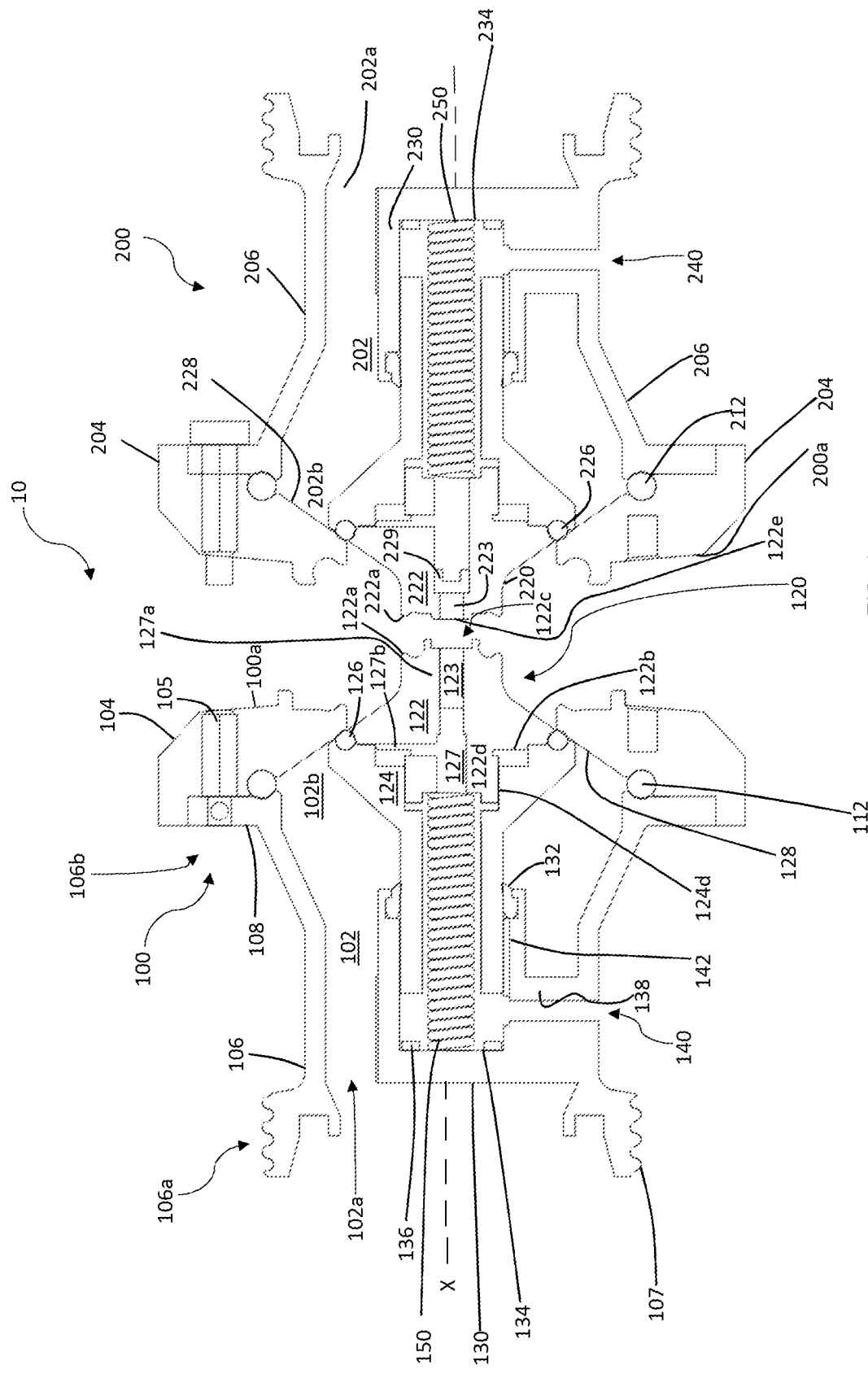
FIG. 1 is a cut-away side view showing the coupling according to the present disclosure, wherein the first and second bodies are detached and wherein the first and second valve members are in the closed position.

FIG. 1 shows a coupling 10 according to a first embodiment of the present disclosure. The coupling 10 has a first body 100 and a second body 200 which can be coupled together to form the coupling 10.

The first body 100 is formed as a pair of releasably connectable sections comprising a front portion 104 and a rear portion 106. The front portion 104 is located proximal to the second body 200 when the first 100 and second 200 bodies are coupled together. The rear portion 106 is located distal from the second body 200 when the first 100 and second 200 bodies are coupled together. The front 104 and rear 106 portions are connected together via respective fasteners (as shall be described in greater detail below).

The first body 100 has a first flow path 102 which extends through the entirety first body 100. The first flow path 102 is used to convey product through the coupling 10. The front 104 and rear portions 106 of the first body 100 each define respective parts of the first flow path 102. The product is typically a comestible product and may be provided in particulate form, fluid form (liquid or gas), or as particles suspended or entrained in a fluid (liquid or gas).

Figure 2:
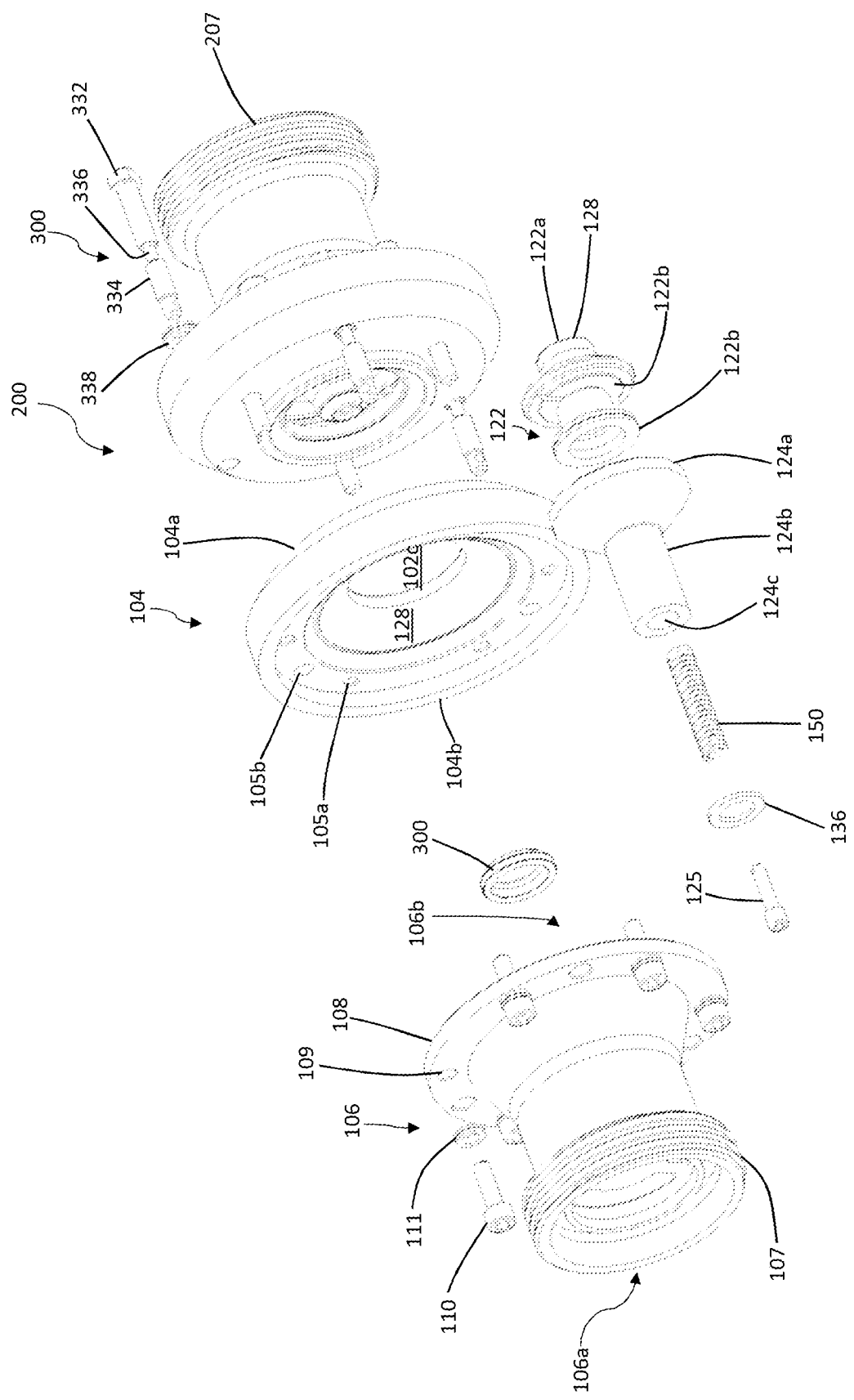
FIG. 2 is an exploded view of the coupling illustrated in FIG. 1.

The rear portion 106 of the first body 100 is substantially conical in shape. The rear portion 106 has a first end 106a, which is located distal from the front portion 104. The first end 106a features a threaded connection 107 to facilitate connection of the coupling 10 to a corresponding pipe or hose in a product flow line. The rear portion 106 also features a second end 106b, located proximal to the front portion 104, having a flange 108. As is shown in FIG. 2, the flange 108 comprises a plurality of through holes 109 to facilitate connection of the rear portion 106 to the front portion 104 of the first body 100, and also to the second body 200 of the coupling 10, via respective fasteners.

A first portion 102a of the first flow path 102 is defined by the rear portion 106 of the first body 100. The first portion 102a of the first flow path 102 is located distal from the second body 200. The first portion 102a of the first flow path 102 is oriented substantially parallel to a longitudinal axis (X) of the coupling 10.

A second portion 102b of the first flow path 102 is also defined by the rear portion 106 of the first body 100. The second portion 102b of the first flow path 102 is located proximal to the second body 200 of the coupling 10. The walls of the rear portion 106, which extend around the second portion 102b of the flow path 102, are outwardly tapered such that the diameter of the first flow path 102 increases as you move along the second portion 102b of the flow path towards the second body 200. The first flow path 102 reaches a maximum diameter at a point proximal to the flange 108. This helps to improve the flow capacity of the coupling 10.

The front portion 104 is provided as an annular element having an aperture extending through its centre. The aperture of the front portion 104 defines a third portion 102c of the first flow path 102.

The front portion 104 features a sealing portion 104a and a flange portion 104b. The sealing portion 104a is the foremost part of the front portion 104 and is located proximal to the second body 200 of the coupling 10. The flange portion 104b is the rearmost part of the front portion 104 and is located distal from the second body 200.

The walls of the sealing portion 104a, which extend around the third portion 102c of the first flow path 102, are inwardly tapered such that the diameter of the first flow path 102 decreases as you move along the third portion 102c of the flow path towards the second body 200. The inwardly tapered walls of the sealing portion 104a define an angled seal surface 128 which cooperates with a corresponding valve member during use to prevent the passage of product through the first flow path, as will be described in greater detail below.

The flange portion 104b is configured to interface with the corresponding flange 108 provided on the rear portion 106 of the first body 100. The flange portion 104b has threaded holes 105a to facilitate fastening of the front portion 104 to the rear portion 106. The flange portion 104b also has through-holes 105b to facilitate fastening of the first body 100 to the second body 200 as will be described in greater detail at a later stage of this application.

Figure 3:
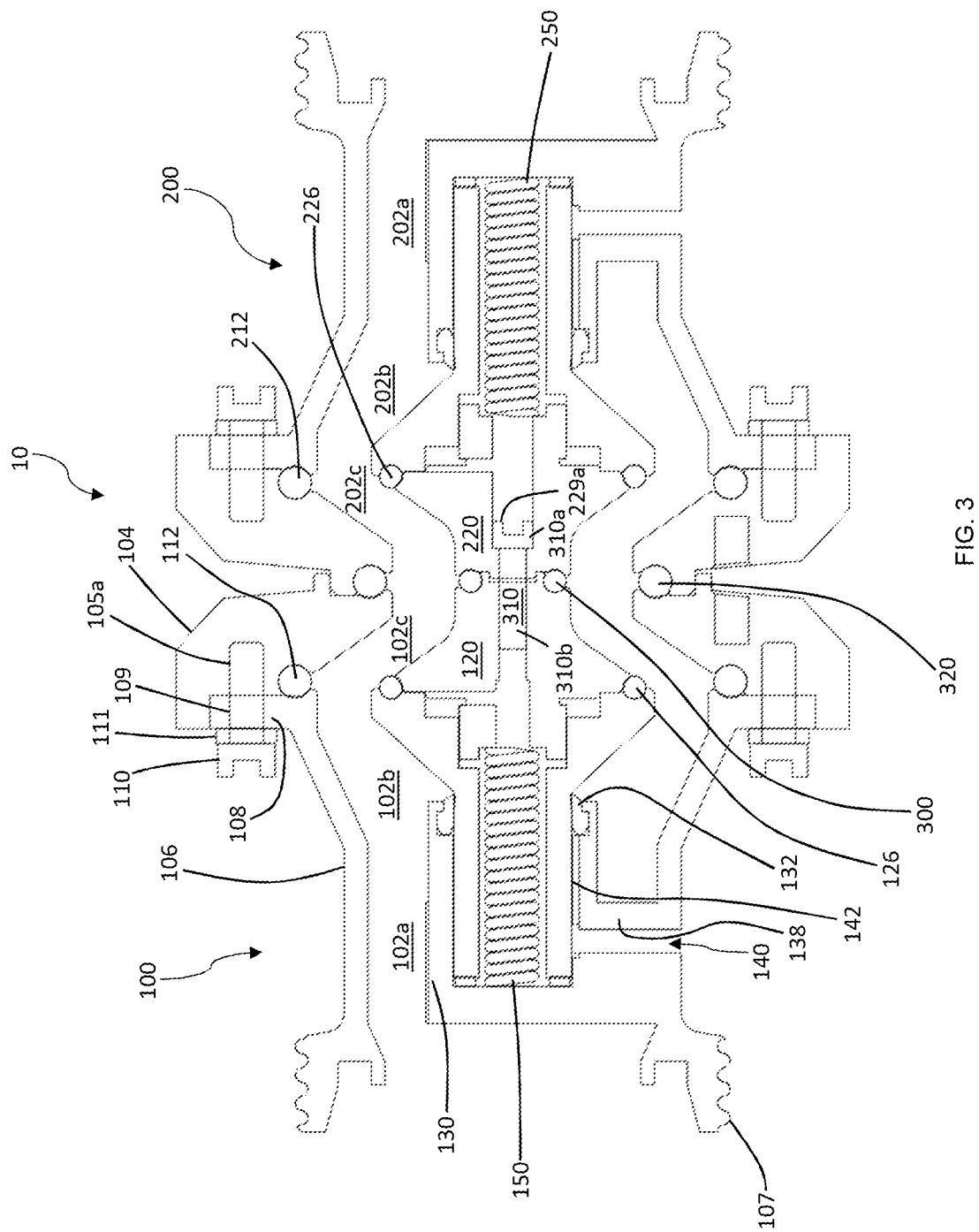
FIG. 3 is a cut-away side view showing the coupling illustrated in FIG. 1, wherein the first and second valve members are in the open position.

The connection between the front 104 and rear 106 portions of the first body 100 is shown in greater detail in FIG. 3. As can be seen in FIG. 3, fasteners 110 (in this case threaded bolts) are inserted through the through-holes 109 provided in the flange 108 and into the threaded holes 105a provided in the front portion 104 of the first body 100. Washers 111 may also be used in conjunction with the fastener 110 to help keep the fasteners 110 from loosening. Forming the first body 100 as a pair of separable parts allows the internal components of the coupling 10 to be more easily inserted into the first body 100 during assembly. However, in some embodiments, the first body may alternatively be provided as a single component rather than as separable parts.

A first body seal 112 is provided in a respective groove formed between the front 104 and rear 106 portions of the first body 100. In the illustrated embodiment, the first body seal 112 is an annular seal. The first body seal 112 is provided outboard of the first flow path 102 for creating a seal between the front 104 and rear 106 portions. The provision of an annular seal between the front 104 and rear 106 portions helps to prevent direct contact between the components of the first body 100 during use. The first body seal 112 prevent metal-to-metal contact between the front 104 and rear 106 portions of the first body 100 inboard of the first body seal 112. This helps to better prevent ingress of product into difficult to clean spaces between the front 104 and rear 106 portions which is detrimental to hygiene as trapped products can harbour bacteria. As such, by preventing metal-to-metal contact between the front 104 and rear 106 portions inboard of the first body seal 112, a more hygienic coupling can be provided.

Returning back to FIG. 1, the first body portion 100 has a first valve member 120. The first valve member 120 is located within the first body portion 100. The first valve member 120 is made up of a valve head 122, a valve body 124 and a valve head seal 126 located between the valve head 122 and the valve body 124. The valve head 122 and valve body 124 are connected via a fastener 125. In the illustrated embodiment, the valve head 122, valve body 124 and valve head seal 126 are provided as separate components. However, it shall be appreciated that in other embodiments, one or more of these features may be combined into a single component.

The valve body 124 has a first portion, proximal to the valve head 122, which forms a seat 124a for the valve head 122. The valve body 124 also has a second portion 124b located distal from the valve head 122. The first portion 124a of the valve body 124 has an inverted conical shape.

The valve head 122 is substantially conical in shape. The valve head 122 has a front portion 122a of the valve head 122 extends out of the first body 100 when the valve member 120 is in the closed position and a rear portion 122b located proximal to the valve body 124. The front portion 122a features an interface surface which cooperates with a corresponding interface surface provided on the second body 200 when the first 100 and second bodies 200 are coupled together to form the coupling 10. As can be seen in FIG. 1, the interface surface of the valve head 122 comprises a slot 122C which is shaped for locating with a corresponding projection provided on the second body 200 of the coupling 10 (as shall be described in greater detail at a later stage within this application).

The valve head 122 also features a bore 123 having a threaded surface for receiving a fastener when the first 100 and second bodies 200 are coupled together to form the coupling 10. The bore 123 extends from an opening located at the slot 122C, through the valve head 122. The threaded surface terminates midway through the depth of the valve head 122.

The rear portion 122b of the valve head 122 sits on the valve seat 124a. The rear portion 122b of the valve head 122 also features a projection 122D which extends into a corresponding recess 124D provided in the valve body 124 to help facilitate connection between the valve head 122 and the valve body 124. In some embodiments, a washer (such as a 16 mm wedge-locking washer manufactured by Nord-Lock GmbH) may also be provided between the projection 122D of the valve head 122 and the corresponding recess 124D of the valve body 124.

The valve head seal 126 is an annular seal provided in a respective groove formed between the seat 124a of the valve body 124 and the rear portion 122b of the valve head 122. The groove for the annular valve head seal 126 is provided at the outer-most extremity of the valve head 122.

As discussed previously, the front portion 104 of the first body 100 has an angled seal surface 128 which reduces the diameter of the flow path 102 passing through the front portion 104 to a point at which the diameter of the flow path 102 is less than a diameter of the first valve member 120. When the first valve member 120 is in the closed position, the annular valve head seal 126 abuts against the angled seal surface 128 of the front portion 104 of the first body 100. The angled seal surface 128 is located outboard of the first product flow path 102 and so, when the annular valve head seal 126 contacts the angled seal surface 128, the passage of product through the first product flow path 102 is prevented.

In the illustrated embodiment, the annular valve head seal 126 is the only point of contact between the valve head and the annular seal surface. This helps to prevent wear between the valve head and annular seal surface and also helps to better prevent egress of product between the valve head and the annular seal surface when the valve member is in the closed position.

The second portion 124b of the valve body 124 is substantially cylindrical in shape and is housed within a first chamber 130 provided within the first body 100. In the illustrated embodiment, the first chamber is integrally formed with the rear portion 106 of the first body 100. However, it shall be appreciated that in other embodiments, the first chamber 130 may be provided as a separate component.

The first chamber 130 is provided as a cylinder located centrally within the first body 100. The first flow path 102 extends around a circumference of the first chamber 130. A cylinder seal 132 is provided between the interior walls of the first chamber 130 and an exterior of the second portion 124b of the valve body 124 such that the first chamber 130 is sealed against product ingress.

In the illustrated embodiment, the first chamber 130 is secured within the first body 100 by supporting arms 138 which extend between the rear portion 106 of the first body 100 and an exterior surface of the first chamber 130. The first flow path 102 is provided in three segments (not shown) extending between each of the supporting arms 138 with each segment extending around a portion of the circumference of the first chamber 130. In the illustrated embodiment, the supporting arms are integrally formed with the rear portion 106 of the first body. However, in other embodiments, the supporting arms may be provided as separate components.

As can be seen in FIGS. 1 and 3, the second end 124b of the valve body 124 acts as a piston within the first chamber 130. As the second end 124b of the valve body 124 is reciprocated within the first chamber 130, the first valve member 120 is subsequently actuated between the closed position shown in FIG. 1, in which the annular valve head seal 126 is in contact with the angled seal surface 128, and the open position shown in FIG. 3, in which the annular valve head seal 126 is located substantially coplanar with the annular first body seal 112 such that product is able to pass through the first flow path 102.

The second portion 124b of the valve body 124 also includes an internal bore 124c which is sealed against product ingress by the respective seals 126, 132 between the valve head 122 and valve body 124 and between the valve body 124 and the first chamber 130 respectively. The internal bore 124c is open ended and has a first end proximal to the valve head 122 and a second end proximal to the first chamber 130.

The coupling 10 has first closure mechanism comprising a first biasing member 150. In the illustrated embodiment, the first biasing member is a coil spring. However, it shall be appreciated that, in other embodiments, other suitable biasing members may be used. The first biasing member 150 has a first end which is in operable communication with the valve head 122 and a second end which abuts against a base 134 of the first chamber 130. In the illustrated embodiment, the first biasing member 150 is housed within the sealed chamber 130 and within the internal bore 124c of the valve member 120, both of which are sealed against the ingress of product. The first biasing member 150 is therefore isolated from any product passing through the coupling. By isolating the first biasing member 150 from the flow path, the build-up of product in difficult to access parts of the first biasing member 150 can be better avoided, which results in a more hygienic coupling. It shall be appreciated however that in other embodiments, the internal bore 124c may be omitted and the biasing member may alternatively be provided between an end of the valve body and the base of the first chamber.

In use, as the valve member 120 moves from the closed position (see FIG. 1) to the open position (see FIG. 3), the first biasing member 150 becomes compressed between the valve member 120 and the base 134 of the first chamber 130. The valve member 120 is therefore biased into the closed position. This means that should the first 100 and second 200 bodies become detached, and hence the compressive force acting on the first biasing member 150 be removed, the first biasing member 150 will return to its original state causing the valve member 120 to be returned to the closed position. This mechanism allows the valve member 120 to self-close.

A gasket 136 is provided at the base 134 of the first chamber 130. The gasket is typically made from a polymeric material such as rubber. The gasket 136 acts as a buffer between the second portion 124b of the valve body 124 and the base 134 of the first chamber 130 to help prevent metal-to-metal contact between the components which could lead to wear. Furthermore, the gasket 136 also acts as a damper to help prevent unwanted levels of vibration acting of the coupling 10 which could cause unwanted movement of the valve member(s) during use.

A first test port 140 is provided in the first body 100 of the coupling 10. The first test port 140 extends through the first body 100 and has a first end which is in fluid communication with the first chamber 130 and a second end which is in fluid communication with the external atmosphere. The first test port 140 is provided such that any product or fluid present within the first chamber 130 can be quickly identified. As can be seen in FIG. 1, the first chamber 130 and first test port 140 together for a first leakage flow path extending from the cylinder seal 132 to the second end of the first test port 140. As such, in the event of a the cylinder seal 132 failing, any fluid or product will be conveyed to the first test portion 140 where it can be easily detected.

A leakage groove 142 may also be provided in the first test port 140. The leakage groove 142 is located proximal to the first end of the first test port 140. The leakage groove 142 is arranged to convey any product located in the first chamber 130 to the first test port 140 so that any leakages can be quickly and easily detected via the first port 140.

In the illustrated embodiment, the coupling 10 further comprises a pressure sensor 160 which is located proximal to the second end of the test port. The pressure sensor 160 is configured to detect the presence of product within the first chamber 130. However, in other embodiments, other such sensors may be used for this purpose or the first test port 140 may be inspected manually. It shall also be appreciated that in some embodiments, the sensor may be provided at other locations, such as within the first chamber, rather than proximal to the second end of the test port.

An internal channel 127 may also be provided within the valve member 120. The internal channel 127 shown in the illustrated embodiment comprises two passageways 127a, 127b which, together with the internal bore 124c form the internal channel 127. The first passageway 127a is oriented substantially parallel to the longitudinal (X) axis of the coupling 10. The first passageway 127a has a first end in fluid communication with the threaded bore 123 and extends from a mid-depth of the valve head 122 through to a second end located at the rear portion 122b of the valve head 122. The second end of the first passageway 127a is in fluid communication with the internal bore 124c of the valve body 124.

The second passageway 127b is orientated substantially perpendicular to the longitudinal (X) axis of the coupling 10. The second passageway 127b has a first end proximal to the annular valve head seal 126 and extends through the valve head 122 to a second end which is in fluid communication with the first passageway 127a. In the illustrated embodiment, the first 127a and second 127b passageways are oriented substantially perpendicular to one another. However, it shall be appreciated that in other embodiments, the first and second passageways may be oriented differently.

The first 127a and second 127b passageways of the internal channel 127 and the internal bore 124c together form an second leakage flow path extending from the annular valve head seal 126 to the first chamber 130 of the coupling 10. As such, should the annular valve head seal 126 unexpected fail, any product or fluid that seeps into the valve member 120 arrangement will be communicated into the first chamber 130 where it can be quickly and easily identified via the test port 140. In this manner, the integrity of the sealing at the valve head seal 126 can be monitored whilst the coupling is in use.

The first passageway 127a of the internal channel 127 and the internal bore 124c together also form a third leakage flow path extending from the threaded bore 123 of the valve head 122 to the first chamber 130 of the coupling 10. Therefore, in the event that a fluid-tight connection is not achieved between the first and second valve members, any product that seeps into the space between the two valve members will similarly be communicated into the first chamber 130 where it can be quickly and easily identified via the test port 140. In this manner, the integrity of the sealing between the first and second valve members can also be monitored whilst the coupling is in use.

Referring now to FIG. 3, as with the first body 100, the second body 200 also has a respective second flow path 202 extending therethrough for conveying product through the coupling 10. As such, when the first and second bodies 100, 200 are coupled together, the first 102 and second 202 flow paths form a continuous flow path which extends through the coupling 10.

As can be seen in FIGS. 1 and 3, the second body 200 of the coupling 10 is substantially identical to the first body 100 and so, for the sake of conciseness, only the differences and interoperation between the respective bodies shall be described herein below. Like features present on the second body are denoted with like reference numerals having the prefix "2XX" rather than "1XX".

The first 100 and second 200 bodies each define corresponding interfaces 100a, 200a which are brought together to form the coupling 10. Each of the respective interfaces 100a, 200a defines a plane. As has been specified above, a portion of the valve head 122 of the first body 100 extends out of the first body 100 when the valve member 120 is in the closed position. As can be seen in FIG. 1, the front portion 122a of the valve head 122 extends beyond the plane defined by the interface 100a. Similarly, a portion of the valve head 222 of the second body 200 also extends out of the second body 200 when the second valve member 220 is in the closed position. As can be seen in FIG. 1, the front portion 222a of the valve head 222 also extends beyond the plane defined by the interface 200a.

The front portion 222a of the second valve member 220 features an interface surface which cooperates with a corresponding interface surface provided on the first valve member 120 when the first 100 and second bodies 200 are coupled together to form the coupling 10. In the illustrated embodiment, the interface surface of the second valve head 222 features a projection 222E which locates within the slot 122C provided on the first body 100 as the first 100 and second bodies 200 are brought together. However, whilst in the illustrated embodiment the first body is provided with a slot and the second body is provided with a projection, it shall be appreciated that in other embodiments, the second body may be provided with a slot and the first body may be provided with a projection or, in further alternatives, a different type of interconnection may be used.

The coupling 10 is configured to switch from the closed position to the open position when the first 100 and second bodies 200 are brought together. As can be seen in FIGS. 1 and 3, as the interfaces 100a, 200a of the first 100 and second 200 bodies are brought closer and closer together, the front portions 122a, 222a of the respective valve members 120, 220, which project beyond the interfaces 100a, 200a will begin to cooperate and apply a force onto one another. This force causes the first 120 and second 220 valve members to move from the closed position (see FIG. 1) to the open position (see FIG. 3) without the need for an opening handle or lever.

As the valve members 120, 220 are moved from the closed position to the opening position, the respective annular head seals 126, 226 are moved out of contact with the respective angled seal surfaces 128, 228 of the first 100 and second 200 bodies to a position in which the annular valve head seals 126, 226 are located substantially coplanar with the annular first 112 and second 212 body seals. With the valve members 120, 220 in the open position product is able to pass through the first 102 and second 202 flow paths, and hence through the coupling 10 (see FIG. 3).

As the first 120 and second 220 valve members are moved from the closed position to the open position, the respective first 150 and second 250 biasing members become compressed between the respective valve heads 122, 222 and the respective bases 134, 234 of the first 130 and second 230 chambers. The valve members 120, 220 are therefore biased into the closed position. This means that should the first 100 and second 200 bodies become detached, and hence the compressive force acting on the first and second biasing members 150, 250 be removed, the first and second biasing members 150,250 will return to their original state causing the valve members 120,220 to be returned to the closed position. In other words, in the event of the first 100 and second 200 bodies becoming decoupled from one another, the valve members 120,220 will self-close, thereby helping to minimise any potential spillages.

It should also be noted however that even when the first and second valve members 120, 220 are in the original, closed position, the first and second biasing members 150, 250 remain under load. As such, the first and second biasing members 150, 250 continue to apply a force onto the first and second valve members 120, 220 so as to urge the annular valve head seals 126, 226 against the respective seal surfaces 128, 228 when the first and second valve members 120, 220 are in the closed position. This helps to ensure that the respective seals 126, 226 remain compressed when the valve is in the closed position to help further minimise any leakages at the first and second valve heads 122, 222.

A valve sealing element 300 is provided between the interface surfaces of the first 120 and second 220 valve members which helps to prevent direct contact between the valve members outboard of the valve sealing element 300. This helps to further reduce the likelihood of leakage due to valve wear. Furthermore, by preventing metal-to-metal contact between the cooperating valve members outboard of the valve sealing element, the coupling is able to better product becoming trapped in difficult to clean spaces between the valve members which would be detrimental to hygiene.

In the illustrated embodiment, the valve seal element 300 is an annular valve seal element 300 provided within a corresponding groove located on the first valve member 120. However, it shall be appreciated that in other embodiments, the valve seal element may be provided in a groove on the second valve member 220.

An interior fastener 310 is also provided for compressing the valve sealing element 300 between the first 120 and second 220 valve members. In the illustrated embodiment, the interior fastener 310 is provided as a frangible bolt having a head 310a and a shank 310b which is configured to break upon the application of a pre-determined amount of force, typically between 5,000 N to 30,000 N depending on the application. The provision of a frangible bolt helps to limit that amount of force that can be applied to components in the flow line via the coupling which, in turn helps to prevent damage to the flow line during installation and use which could lead to possible spillages. However, in other embodiments, it shall be appreciated that the respective biasing forces provided by the first and second biasing members 150, 250 may be enough to provide sufficient compression of the valve sealing element 300 and so, in some embodiments, the interior fastener 310 may be omitted.

The second valve member 220 features a corresponding slot 229 which extends through the valve member 220 to the threaded bore 223 to allow for insertion of the interior fastener 310. Once inserted into the coupling 10, the shank 310b of the interior fastener 310 extends through the threaded bore 223 in the second valve member 220 and into the threaded bore 123 of the first valve member 120 as is shown in FIG. 3. The slot 229 is sized so as to receive a head 310a of the fastener 310. The slot 229 also features a shoulder portion 229a which prevents the head 310a of the fastener 310 from translating along the respective bores 123, 223. As such, as the fastener 310 is rotated within the threaded bores 123, 223, the fastener 310 will become tensioned, thereby clamping the first 120 and second valve members 220 together. This clamping force compresses the valve sealing element 300 located between the interface surfaces of the valve members 120, 220.

An annular seal 320 is provided between the respective interfaces 100a, 200a of the first and second bodies 100, 200, outboard of the flow path, for creating a seal between the first 100 and second 200 bodies. The coupling 10 is configured such that metal-to-metal contact between the respective first and second bodies 100, 200 inboard of the annular seal 320 is prevented. By preventing metal-to-metal contact between the first 100 and second 200 bodies inboard of the annular seal 320, the ingress of product into difficult to clean spaces between the first 100 and second 200 body can be better prevented. If such ingress were to occur, such product could become trapped and harbour bacteria which would be detrimental to hygiene. As such, by preventing metal-to-metal contact between the first 100 and second 200 bodies, a more hygienic coupling can be provided.

In the illustrated embodiment, the annular seal 320 is provided within a corresponding groove located in the second body 200. However, it shall be appreciated that in other embodiments, the annular seal 320 may be provided in a groove in the first body 100 or may simply be applied during installation.

Figure 4:
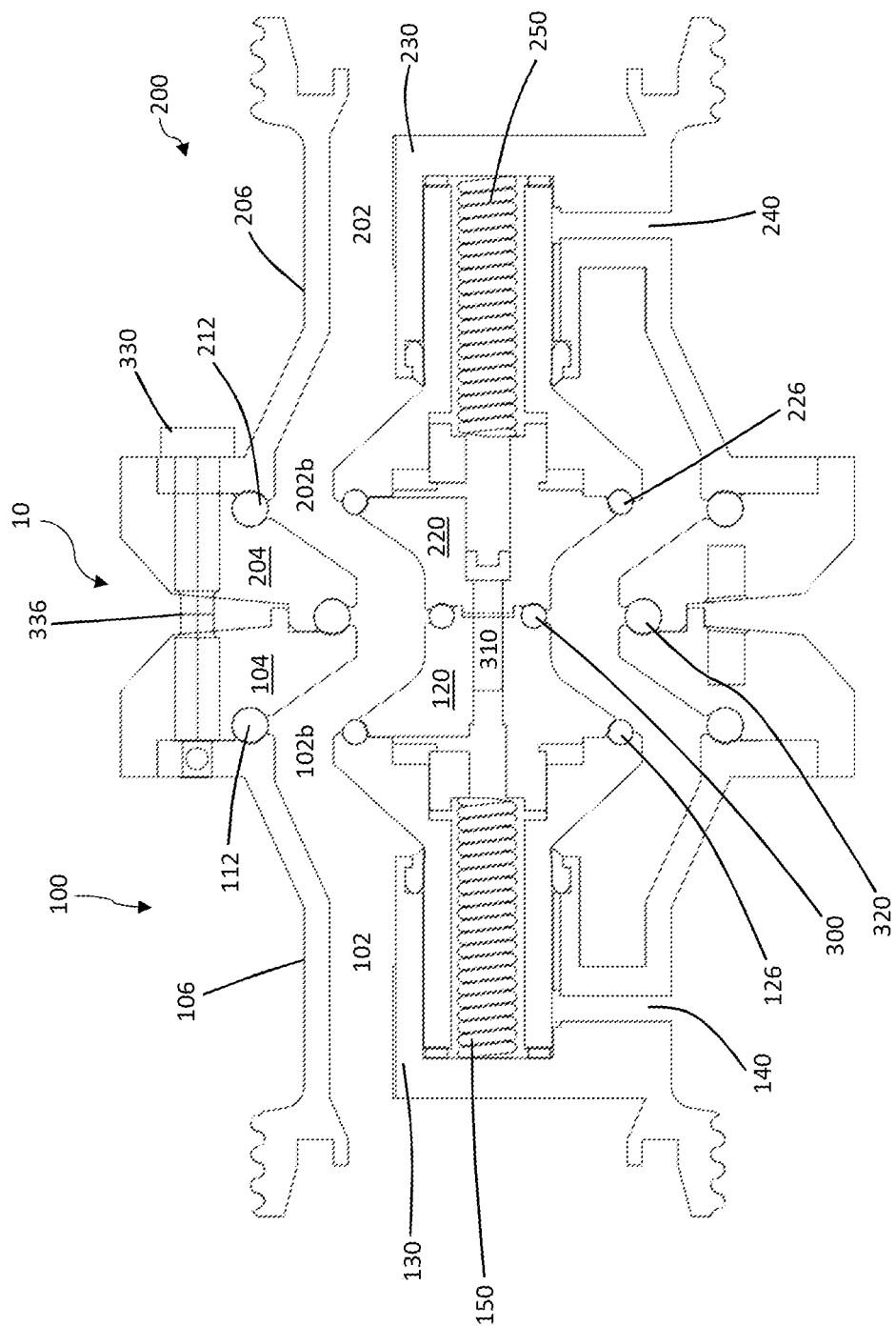
FIG. 4 is a cut-away side view showing the coupling illustrated in FIG. 3 which has been rotated to show the exterior fastener connecting the first and second bodies of the coupling assembly.

Exterior fasteners 330 are also provided to compress the annular seal 320 between the first 100 and second bodies 200 once they have been brought together to form the coupling 10 as shown in FIG. 4. In the illustrated embodiment, the exterior fasteners 330 are frangible bolts having a head 332 and a shank 334. The exterior fasteners 330 also feature a frangible portion 336 which is machined into the shank 334. The frangible portion 336 is machined to a diameter such that the exterior fastener 330 will break upon the application of a pre-determined amount of force.

The respective shanks 334 of the exterior fasteners 330 inserted through the respective through holes 105b, 205b, 109, 209 provided in the respective flanges 104b, 108, 204b, 208 of the first 100 and second 200 bodies. The respective heads 332 of the exterior fasteners 330 abut against an outer surface of the rear portion 206 of the second body 200. In the illustrated embodiment, the respective through holes 105b provided in the first body 100 have a threaded internal surface for cooperating with a corresponding thread provided on an end of the exterior fastener 330. Therefore, as the exterior fasteners 330 are rotated, they will become tensioned, thereby clamping the first 100 and second 200 bodies together. This clamping force compresses the annular seal 320 located between the interface surfaces 100a, 200a of the first 100 and second 200 bodies. Washers 338 may also be used in conjunction with the fasteners 330 to help keep the fasteners 330 from loosening.

Whilst in the illustrated embodiment the exterior fasteners 330 comprise a head 332 which abuts the second body 200 and threaded internal surfaces are provided in the through holes of the first body, in other embodiments, the head 332 may abut the first body 100 and the threaded internal surfaces may be provided in the through holes of the second body or, alternatively, a different type of exterior fastener may be used.

The coupling 10 illustrated in FIGS. 1 to 4 is primarily designed to be vertically oriented when placed within a given product flow line. However, it shall be appreciated that in other embodiments the coupling 10 may be placed in a horizontal, inclined or declined orientation.

The term "comestible products" is used herein to describe products for human or animal consumption.

It shall be appreciated that comestible products may be provided in particulate form, fluid form (liquid or gas), or as particles suspended or entrained in a fluid (liquid or gas).

It shall also be appreciated that whilst the illustrated embodiment describes a self-closing coupling, in other embodiments the present disclosure may be incorporated into coupling which do not have a self-closing functionality.

Whilst the abovementioned features have been described with reference to an embodiment in which the first and second couplings are substantially identical, it shall be appreciated that in some other embodiments, the first and second coupling may not be identical in form.

Although the invention has been described above with reference to one or more preferred disclosures, it will be appreciated that various changes or modifications may be made without departing from the scope of the invention as defined in the appended claims.

The invention claimed is:

1. A coupling for use with comestible products, the coupling comprising:
    a first body having a first flow path extending therethrough;
    a second body having a second flow path extending therethrough;
    wherein the first body and second body are configured for coupling together such that the first flow path and second flow path form a continuous flow path extending through the coupling when the first body and second body are coupled together;
    the coupling further comprising a valve member actuable between an open position, wherein product is able to pass through the continuous flow path, and a closed position, wherein the passage of the product through the continuous path is prevented; and
    wherein the coupling comprises a closure mechanism configured for actuating the valve member between the open position and closed position;
    wherein the closure mechanism includes a biasing member in the form of a spring for biasing the valve member into the closed position;
    wherein the coupling is configured for the valve member to self-close by switching from the open to closed position if the first body is undesirably decoupled from the second body; and
    wherein the biasing member is isolated from the flow of the product passing through the continuous flow path;
    wherein the biasing member is operable in a first chamber which is isolated from the continuous flow path, and wherein the biasing member is in operable communication with the valve member;
    wherein the first chamber is at least partially defined within a cylinder provided within the first body, wherein the interior of the cylinder is isolated from a flow of the product from the continuous flow path;
    wherein the valve member comprises a piston-like body, a portion of which extends within the cylinder and is arranged for reciprocation within the cylinder, for moving the valve member between the open and closed positions;
    wherein the coupling further comprises a cylinder seal located between the cylinder and the piston-like body for sealing the cylinder against product ingress; and
    wherein the valve member extends out of the first body when the valve member is in the closed position, and wherein the coupling is configured such that, when the first body and second body are brought together, a load is applied to the valve member to cause the valve member to move from the closed position to the open position.

2. The coupling according to claim 1, wherein the cylinder is arranged within the first flow path, such that the product is able to flow around a circumference of the cylinder as it passes along the first flow path, in use.

3. The coupling according to claim 1, wherein the piston-like body comprises an internal bore, and wherein the biasing member extends at least partially within said internal bore; wherein the internal bore extends within the piston-like body beyond an open end of the cylinder; wherein the biasing member extends within the internal bore beyond the open end of the cylinder.

4. The coupling of claim 1, wherein the valve member has a valve head, wherein the valve head includes an annular seal arranged for cooperation with an annular seal surface within the coupling, for preventing product flow through the first body when the valve member is in the closed position.

5. The coupling according to claim 2, the coupling further comprising a plurality of arms extending inwardly from the first body, and which support the cylinder within the first flow path.

6. The coupling according to claim 5, wherein the plurality of supporting arms is an integral formation of the first body and/or the cylinder.

7. The coupling of claim 4, wherein the annular seal surface is provided on the first body.

8. The coupling of claim 4, wherein the valve member comprises the valve head and a valve body provided as separate, releasably connectable components, wherein the annular seal is housed between the valve head and the valve body, and provides a seal between the valve head and the valve body.

9. The coupling according to claim 1, wherein the valve member has a valve head, wherein the valve head includes an annular seal arranged for cooperation with an annular seal surface within the coupling, for preventing product flow through the first body when the valve member is in the closed position;
   wherein the valve head is located external to the cylinder; and
   wherein the valve member defines an internal channel extending from the annular seal to the cylinder.

10. The coupling according to claim 9, further comprising a test port having a first end in fluid communication with the cylinder and a second end in fluid communication with an external atmosphere, and wherein the internal channel, cylinder and test port together define a second leakage flow path extending from the annular seal to the external atmosphere for monitoring the integrity of the sealing effect between the valve head and valve body.

11. The coupling according to claim 9, wherein a first portion of the internal channel is defined by a passageway provided in the valve head and wherein a second portion of the internal channel is defined by an internal bore of the piston-like body.

12. The coupling according to claim 1, wherein the coupling is configured so that the spring is arranged to be under compressive load when the valve member is in the open position or the closed position.

13. A coupling for use with comestible products, the coupling comprising:
   a first body having a first flow path extending therethrough;
   a second body having a second flow path extending therethrough;
   wherein the first body and second body are configured for coupling together such that the first flow path and second flow path form a continuous flow path extending through the coupling when the first body and second body are coupled together;
   the coupling further comprising a valve member actuable between an open position, wherein product is able to pass through the continuous flow path, and a closed position, wherein the passage of the product through the continuous path is prevented; and
   wherein the coupling comprises a closure mechanism configured for actuating the valve member between the open position and closed position;
   wherein the closure mechanism includes a biasing member in the form of a spring for biasing the valve member into the closed position;
   wherein the coupling is configured for the valve member to self-close by switching from the open to closed position if the first body is undesirably decoupled from the second body; and
   wherein the biasing member is isolated from the flow of the product passing through the continuous flow path;
   wherein the biasing member is operable in a first chamber which is isolated from the continuous flow path, and wherein the biasing member is in operable communication with the valve member;
   wherein the first chamber is at least partially defined within a cylinder provided within the first body, wherein the interior of the cylinder is isolated from a flow of the product from the continuous flow path;
   wherein the valve member comprises a piston-like body, a portion of which extends within the cylinder and is arranged for reciprocation within the cylinder, for moving the valve member between the open and closed positions;
   wherein the coupling comprises a cylinder seal located between the cylinder and the piston-like body for sealing the cylinder against product ingress; and
   wherein the coupling further comprises an annular seal located outboard of the flow path for creating a seal between the first and second bodies when the first body and second body are coupled together; and wherein the coupling is configured such that metal-to-metal contact between the first and second bodies inboard of the annular seal is prevented.

14. A coupling for use with comestible products, the coupling comprising:
   a first body having a first flow path extending therethrough;
   a second body having a second flow path extending therethrough;
   wherein the first body and second body are configured for coupling together such that the first flow path and second flow path form a continuous flow path extending through the coupling when the first body and second body are coupled together;
   the coupling further comprising a valve member actuable between an open position, wherein product is able to pass through the continuous flow path, and a closed position, wherein the passage of the product through the continuous path is prevented; and
   wherein the coupling comprises a closure mechanism configured for actuating the valve member between the open position and closed position;
   wherein the closure mechanism includes a biasing member in the form of a spring for biasing the valve member into the closed position;
   wherein the coupling is configured for the valve member to self-close by switching from the open to closed position if the first body is undesirably decoupled from the second body; and
   wherein the biasing member is isolated from the flow of the product passing through the continuous flow path;
   wherein the biasing member is operable in a first chamber which is isolated from the continuous flow path, and wherein the biasing member is in operable communication with the valve member;
   wherein the first chamber is at least partially defined within a cylinder provided within the first body, wherein the interior of the cylinder is isolated from a flow of the product from the continuous flow path;
   wherein the valve member comprises a piston-like body, a portion of which extends within the cylinder and is arranged for reciprocation within the cylinder, for moving the valve member between the open and closed positions;
   wherein the coupling comprises a cylinder seal located between the cylinder and the piston-like body for sealing the cylinder against product ingress;
   wherein the first body comprises a plurality of releasably connectable sections including a front portion for cooperation with the second body when the first body and second body are coupled together, and a rear portion in which the biasing member is mounted; wherein the valve member is carried on the rear portion; and
   wherein the coupling further comprises an annular seal located outboard of the first flow path for creating a seal between the front portion and rear portion of the first body; wherein the coupling is configured such that metal-to-metal contact between the front portion and rear portions inboard of the annular seal is prevented.

15. The coupling according to claim 14, wherein the front portion of the first body defines an annular seal surface for cooperation with the valve member to prevent flow of the product through the first flow path; wherein the valve member includes an annular seal element for cooperation with said annular seal surface; wherein the coupling is configured such that the biasing member applies a load to the valve member so as to urge the annular seal against the annular seal surface when the valve member is in the closed position; wherein the annular seal element is of deformable nature; and wherein the coupling is configured such that the annular seal element is the only point of contact between the valve member and the annular seal surface.

* * * * *